US009997264B2

(12) United States Patent
Prather et al.

(10) Patent No.: US 9,997,264 B2
(45) Date of Patent: Jun. 12, 2018

(54) ENHANCED NUCLEAR SUMP STRAINER SYSTEM

(75) Inventors: Carl Prather, Birmingham, AL (US); Denis Grob, Winterthur (CH); Claes Lemcke, Dietlikon (CH)

(73) Assignee: Control Components, Inc., Rancho Santa Margarita, CA (US)

( * ) Notice: Subject to any disclaimer, the term of this patent is extended or adjusted under 35 U.S.C. 154(b) by 1774 days.

(21) Appl. No.: 13/396,396

(22) Filed: Feb. 14, 2012

(65) Prior Publication Data
US 2013/0208847 A1 Aug. 15, 2013

(51) Int. Cl.
| | |
|---|---|
| *G21C 19/307* | (2006.01) |
| *B01D 35/30* | (2006.01) |
| *B01D 29/27* | (2006.01) |
| *B01D 29/52* | (2006.01) |
| *B01D 29/58* | (2006.01) |
| *G21C 15/18* | (2006.01) |

(52) U.S. Cl.
CPC ........... *G21C 19/307* (2013.01); *B01D 29/27* (2013.01); *B01D 29/52* (2013.01); *B01D 29/58* (2013.01); *B01D 35/30* (2013.01); *G21C 15/18* (2013.01)

(58) Field of Classification Search
None
See application file for complete search history.

(56) References Cited

U.S. PATENT DOCUMENTS

| 3,952,766 A | 4/1976 | Johnson |
| 4,376,091 A * | 3/1983 | Netkowicz et al. .......... 376/283 |
| 5,453,180 A | 9/1995 | Henriksson et al. |
| 5,539,790 A | 7/1996 | Henriksson et al. |
| 5,688,402 A | 11/1997 | Green |

(Continued)

FOREIGN PATENT DOCUMENTS

| WO | 2008132491 A2 | 11/2008 |
| WO | 1997028537 | 11/2009 |

OTHER PUBLICATIONS

ECCS PWR Sump Screen—Chemical Head Loss Issue, from Public Meeting with the Nuclear Energy Institute (NEI) and Industry to Discuss GSI-191 Chemical Effects Testing and Path Forward for GSI-191. Oct. 19, 2006. Accession No. ML063130277. publicly available online: <https://adamswebsearch2.nrc.gov/webSearch2/main.jsp?AccessionNumber=ML063130277>.*

(Continued)

*Primary Examiner* — Jack W Keith
*Assistant Examiner* — Lily C Garner
(74) *Attorney, Agent, or Firm* — Stetina Brunda Garred and Brucker; Mark B. Garred

(57) ABSTRACT

In accordance with the present invention, there is provided a strainer system for use in a nuclear sump. The strainer system of the present invention includes at least one primary strainer module which defines a primary strainer/filter surface. In the strainer system, the primary strainer surface of the primary strainer module has a debris interceptor which is cooperatively engaged thereto, and may be outfitted with one or more pressure released or activated membranes. In a loss of coolant accident, the debris interceptor, alone or in combination with the pressure activated membrane(s), is adapted to reduce the differential pressure experienced across the strainer system in nuclear power plants with medium to high fiber loads.

20 Claims, 8 Drawing Sheets

(56) References Cited

U.S. PATENT DOCUMENTS

| | | | |
|---|---|---|---|
| 5,759,399 | A | 6/1998 | Bilanin et al. |
| 7,822,164 | B1* | 10/2010 | Kielbowicz .................. 376/313 |
| 2005/0167735 | A1 | 8/2005 | Kielbowicz |
| 2005/0209563 | A1 | 9/2005 | Hopping et al. |
| 2005/0284293 | A1 | 12/2005 | Rubas |
| 2006/0075697 | A1* | 4/2006 | Oates et al. .................. 52/177 |
| 2007/0084782 | A1 | 4/2007 | Smith et al. |
| 2008/0156712 | A1 | 7/2008 | Rhodes et al. |
| 2008/0269468 | A1* | 10/2008 | Vogel et al. ................. 530/414 |
| 2009/0225924 | A1* | 9/2009 | Lelickens et al. ............ 376/261 |
| 2010/0266084 | A1* | 10/2010 | Ahlfeld et al. ............... 376/207 |
| 2011/0253608 | A1* | 10/2011 | Volkmer et al. ............. 210/131 |

OTHER PUBLICATIONS

CCI Chemical Testing Status of Strainer Testing by Dr. Urs Blumer. Aug. 23, 2007. Accession No. ML072420572. publicly available online: <https://adamswebsearch2.nrc.gov/webSearch2/main.jsp?AccessionNumber=ML072420572>.*

JW Walker and HL Williams. Overview of Site Specific Blockage Solutions at US PWRs. OECD, NEA. from "Debris Impact on Emergency Coolant Recirculation." Workshop Proceedings, Albuquerque, NM. 2004. pp. 373-388. full document publicly available online: <https://www.oecd-nea.org/nsd/pubs/2004/5468-debris-impact.pdf>.*

* cited by examiner

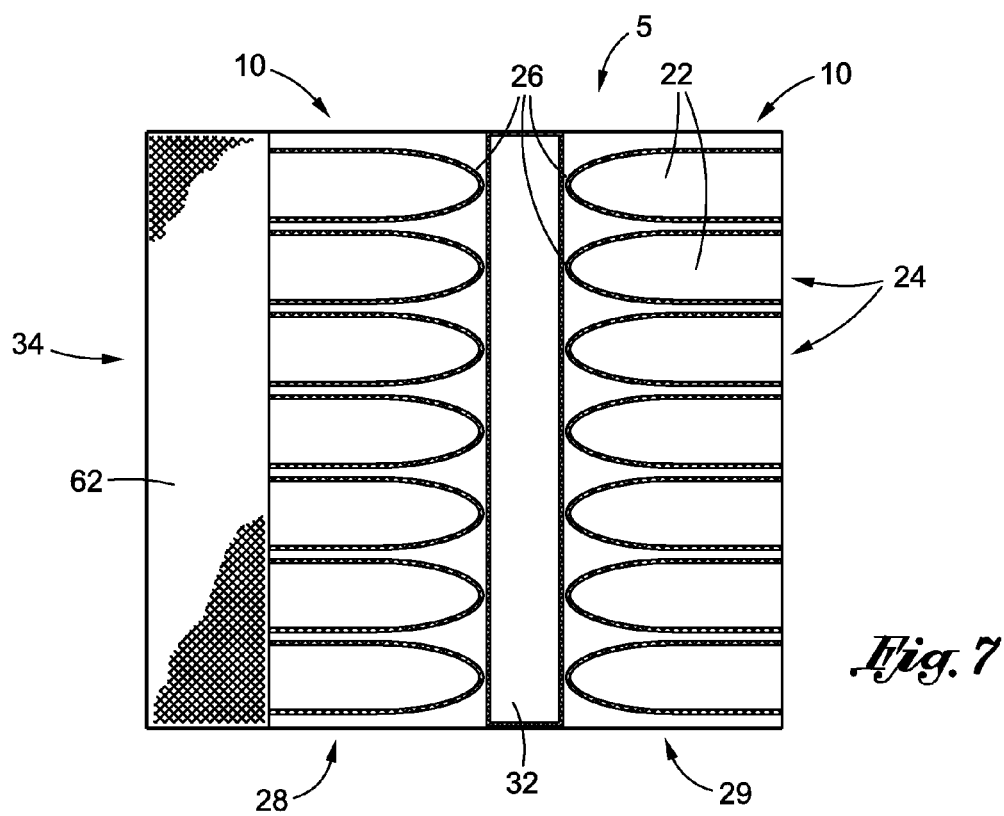
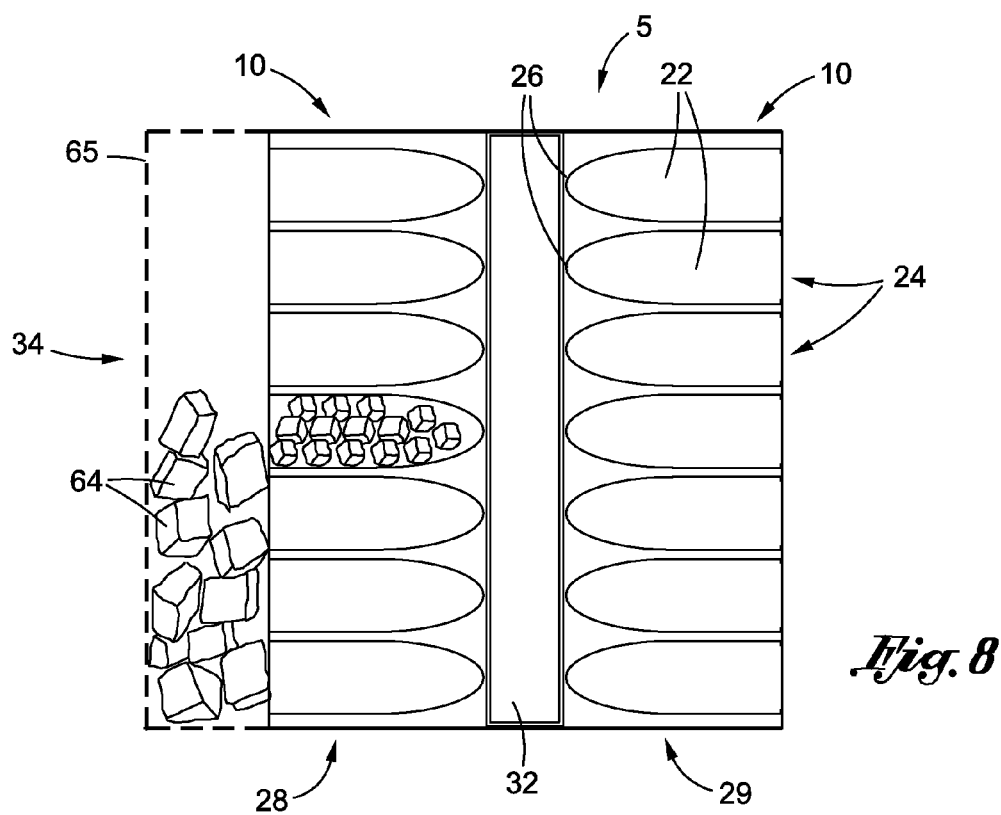

ENHANCED NUCLEAR SUMP STRAINER SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Technical Field of the Invention

The present invention relates generally to strainer devices and, more particularly, to a strainer system for use in a nuclear sump. The strainer system of the present invention includes at least one primary strainer module which defines a primary strainer/filter surface. The primary strainer surface of the primary strainer module includes a debris interceptor which is cooperatively engaged thereto, and comprises a screen or mesh layer which may be outfitted with one or more pressure released or activated membranes.

2. Description of the Related Art

A nuclear power plant typically includes an emergency core cooling system that circulates large quantities of cooling water to critical reactor areas in the event of accidents. A boiling water reactor or BWR commonly draws water from one or more reservoirs, known as suppression pools, in the event of a loss of coolant accident. More particularly, water is pumped from the suppression pool to the reactor core and then circulated back to the suppression pool in a closed loop. A loss of coolant accident can involve the failure of reactor components that introduce large quantities of solid matter into the cooling water, which entrains the solids and carries them back to the suppression pool. For example, if a loss of coolant accident results from the rupture of a high pressure pipe, quantities of thermal insulation, concrete, paint chips and other debris can be entrained in the cooling water.

In contrast to a BWR, a pressurized water reactor or PWR, after a loss of coolant accident, typically draws cooling water from a reactor water storage tank and, after a signal, shuts off the flow from the storage tank and re-circulates this water through the reactor. In this regard, the pressurized water reactor has a containment area that is dry until it is flooded by the occurrence of an accident, with the emergency core cooling system using a pump connected to a sump in the containment area to circulate the water through the reactor. Nevertheless, the water that is pumped in the event of an accident will also usually contain entrained solids that typically include insulation, paint chips, and particulates. Thus, in both types of reactors (i.e., boiling water reactors and pressurized water reactors), cooling water is drawn from a reservoir and pumped to the reactor core, with entrained solids or debris potentially impairing cooling and damaging the emergency core cooling system pumps if permitted to circulate with the water.

In recognition of the potential problems which can occur as a result of the presence of entrained solids or debris in the coolant water of the emergency core cooling system, it is known in the prior art to place strainers in the coolant flow path upstream of the pumps, usually by immersing them in the cooling water reservoir. It is critical that these strainers be able to remove unacceptably large solids without unduly retarding the flow of coolant. In this regard, the pressure (head) loss across the strainer must be kept below the minimum required net positive suction head levels necessary to safely operate the recirculation pumps and maintain adequate cooling water flow to the reactor core. Strainers are commonly mounted to pipes that are part of the emergency core cooling system and that extend into the suppression pool or sump, with the emergency core cooling system pumps drawing water through the strainers and introducing the water to the reactor core. There has been considerable effort expended in the prior art in relation to the design of strainers to minimize both head loss across the strainer and debris which can bypass the strainer, for the desired coolant flow. Existing strainers often include a series of stacked perforated hollow discs or flat perforated plates and a central plenum through which water is drawn by the emergency core cooling system pump. The perforated discs or plates prevent debris larger than a given size from passing the strainer perforations and reaching the pumps.

As is apparent from the foregoing, large amounts of fibrous material can enter the circulating coolant water in the event of a reactor accident. This fibrous material, which often originates with reactor pipe or component insulation damaged during the design basis event enters the emergency core cooling system coolant stream in the event of a loss of coolant accidents indicated above, typically accumulates on the strainer surfaces and captures other particulate, paint chips, and other matter entrained in the flow. The resulting fibrous debris bed on the strainer surfaces can quickly block the flow through the strainer, even though the trapped particulates may be small enough to pass through the strainer perforations. More particularly, the debris accumulates in a fluffy density in and on the strainer until the strainer becomes completely covered with a fiber and particulate debris bed. Depending on the break location and its surrounding insulation configuration, the strainer may become so fully filled and coated with the fibrous insulation debris that it loses its complex geometric surface advantages, thus becoming a simple strainer. Throughout the event, some debris and components in the containment typically dissolve into solution and interact with chemical buffers present in the containment. At the same time, containment temperatures are trending down. This phenomenon causes certain chemical precipitates to form which eventually make their way to the strainer. Once they reach the strainer surface, these chemical precipitates effectively fill the interstitial spaces in the fiber debris bed and dramatically increase the debris bed density. This increase in density significantly increases the effective pressure drop experienced across the strainer. Additionally, there are numerous remaining unknown phenomenon, the effect of radionuclide's on the debris bed, micro-organism blooms in the warm, moist environment of the containment, etc. which must also be accounted for in a strainer's ability to meet its required performance criteria.

The prior art has attempted to address the above-described flow blockage effect by making the strainer larger, the goal being to distribute the trapped debris over more area, reducing the velocity through the debris bed, and further reducing the head loss across the strainer as a whole. This solution, however, is often undesirable since the available space in a reactor for a suction strainer is usually limited, and further because larger strainers are typically more costly. As a result, the situation sometimes arises wherein the expected debris load after a loss of coolant accident can dictate a need for strainers that are too large for the available envelope for them in the containment area. Moreover, large strainers are often more difficult work with and thus more costly to install. In addition, prior art emergency core cooling system strainers have been constructed in ways that make them somewhat expensive to fabricate.

In an attempt to address the aforementioned deficiencies associated with existing nuclear power plant strainer designs, Applicant developed the improved strainer systems described in its co-pending U.S. patent application Ser. No. 12/578,413 entitled INCREASED EFFICIENCY STRAINER SYSTEM filed Oct. 13, 2009, and Ser. No. 12/835,509 entitled INCREASED EFFICIENCY STRAINER SYSTEM filed Jul. 13, 2010, the disclosures of which are incorporated herein by reference. The present invention represents an improvement to these systems by providing a strainer system design which is specifically suited to manage the differential pressure experienced across the strainer system in nuclear power plants with various and unique debris loads, available space, flow rates, minimum water levels, etc. through the use of a uniquely configured debris interceptor in conjunction with a primary strainer module. Such differential pressure management ensures that the recirculation pumps continue to function in an uninhibited manner without the plant needing to perform large insulation modifications, with the design of the strainer system also being intended to reduce the strainer surface area required to meet differential pressure and debris bypass strainer performance criteria. Various features and advantages of the present invention will be described in more detail below.

SUMMARY OF THE INVENTION

In accordance with the present invention, there is provided an increased efficiency strainer system which is particularly suited for use in the emergency core cooling system of a nuclear power plant. The strainer system includes one or more strainer cassettes or cartridges, with each such cassette or cartridge including a plurality of strainer pockets disposed in side-by-side relation to each other. Multiple cassettes or cartridges may be assembled together to form a strainer module of the strainer system. Each cartridge has a generally quadrangular configuration, as do the individual strainer pockets included therein. The strainer pockets of the cartridge each define an inflow end, with the inflow ends of the strainer pockets of the cartridge facing in a common direction. The inflow ends of the strainer pockets within the strainer module collectively define the primary strainer surface of the strainer module.

In accordance with one embodiment of the present invention, a debris interceptor (e.g., a sacrificial strainer screen) is outfitted onto the strainer module in a manner wherein such debris interceptor effectively traps and thus prevents the bulk of the debris present in a post loss of coolant accident scenario from reaching the primary strainer surface of the corresponding strainer module. In this regard, as the recirculation pumps move water through the strainer system, the mechanical debris present in the containment will accumulate on the debris interceptor. Once enough debris (mechanical and/or chemical) accumulates, a pre-defined differential pressure set point is reached which effectively opens at least one membrane (e.g., a rupturable membrane) which is integrated into the debris interceptor. The membrane remains closed when only a low pressure load is exerted thereon. However, if at any point a pre-defined threshold differential pressure is exerted thereon, the membrane, is deflected, deformed or fails into an open position. The membrane opening facilitates the creation of an open flow path bypassing the bulk of the debris accumulated on the sacrificial debris interceptor and provides a flow path directly to the primary strainer surface of the strainer module. This allows the primary strainer surface to remain fairly clean until the set point differential pressure is reached across the debris interceptor. Any remaining debris which arrives at the strainer module later in the accident mitigation will then accumulate on a fairly clean surface, i.e., the primary strainer surface. Though the building of a dense, uniform debris layer on the primary strainer surface is improbable, if one does form and the differential pressure again reaches the set point, it is contemplated that another strainer module within the strainer system will open as facilitates a repeat of the aforementioned cycle.

Depending on the plant specific variables (flow rate, debris types and quantities, components in the containment, buffer, submergence, allowable NPSH, temperature curve, etc), the bulk of the fiber and particulate debris should already have collected on the debris interceptor prior to any membrane(s) thereof being actuated to an open position. Typically, by this point, the chemical precipitate will have begun to settle across the majority of the containment, thus helping to prevent additional fibrous debris which would normally release due to erosion from transporting to the strainer due to a chemical precipitate coating being formed thereon. The chemical precipitate forms directly on and adheres to the fibrous debris making it less transportable. This helps ensure that the fibrous debris layer remains collected in its initial deposition location on the debris interceptor even after the bypassing flow path through the membrane has been opened. Typically, chemical precipitate alone has little to no impact on differential pressure when there exists a relatively clean strainer area available in the strainer system.

In accordance with another embodiment of the present invention, the primary surface of the strainer module is outfitted with a debris interceptor comprising a layered stainless steel mesh and/or stainless steel mesh cubes which are thus introduced into the flow path downstream of the debris laden water, and facilitate the creation of a lower density debris bed. A low density debris bed in certain debris loads can result in a lower final differential pressure across the strainer system. In this regard, the lower density debris bed allows the arriving particulate or chemical precipitate to penetrate the debris bed in greater depth than a higher density debris bed. This increased bed penetration helps prevent the debris from forming a dense critical debris layer on the outermost surface of the debris bed causing further bed compression, higher density, and ultimately higher differential pressure. The aforementioned mesh or mesh cubes of the debris interceptor induces such lower density debris bed. In this regard, the incoming debris collects along the mesh surfaces as it travels toward the primary strainer surface of the strainer module. Because the fibrous debris tends to agglomerate with other fibrous debris, the volume based strainer created by this configuration can prevent a dense, uniform bed from forming on the strainer system. This induced debris bed configuration also reduces head loss and debris bypass across the strainer system. As an added benefit, if a substantially dense debris bed were to form across the mesh cubes, they are designed to flex and deform to induce a rupture in any uniform, dense debris layer which may form.

The present invention is best understood by reference to the following detailed description when read in conjunction with the accompanying drawings.

BRIEF DESCRIPTION OF THE DRAWINGS

These, as well as other features of the present invention, will become more apparent upon reference to the drawings wherein:

FIG. 7 is a cross-sectional view depicting the strainer modules of the strainer system shown in FIG. 4 as outfitted with a debris interceptor comprising a sacrificial wire mesh layer in accordance with a third embodiment of the present invention;

FIG. 8 is a cross-sectional view depicting the strainer modules of the strainer system shown in FIG. 4 as outfitted with a debris interceptor comprising sacrificial wire mesh cubes in accordance with a fourth embodiment of the present invention.

Common reference numerals are used throughout the drawings and detailed description to indicate like elements.

DETAILED DESCRIPTION OF THE INVENTION

Figure 1:
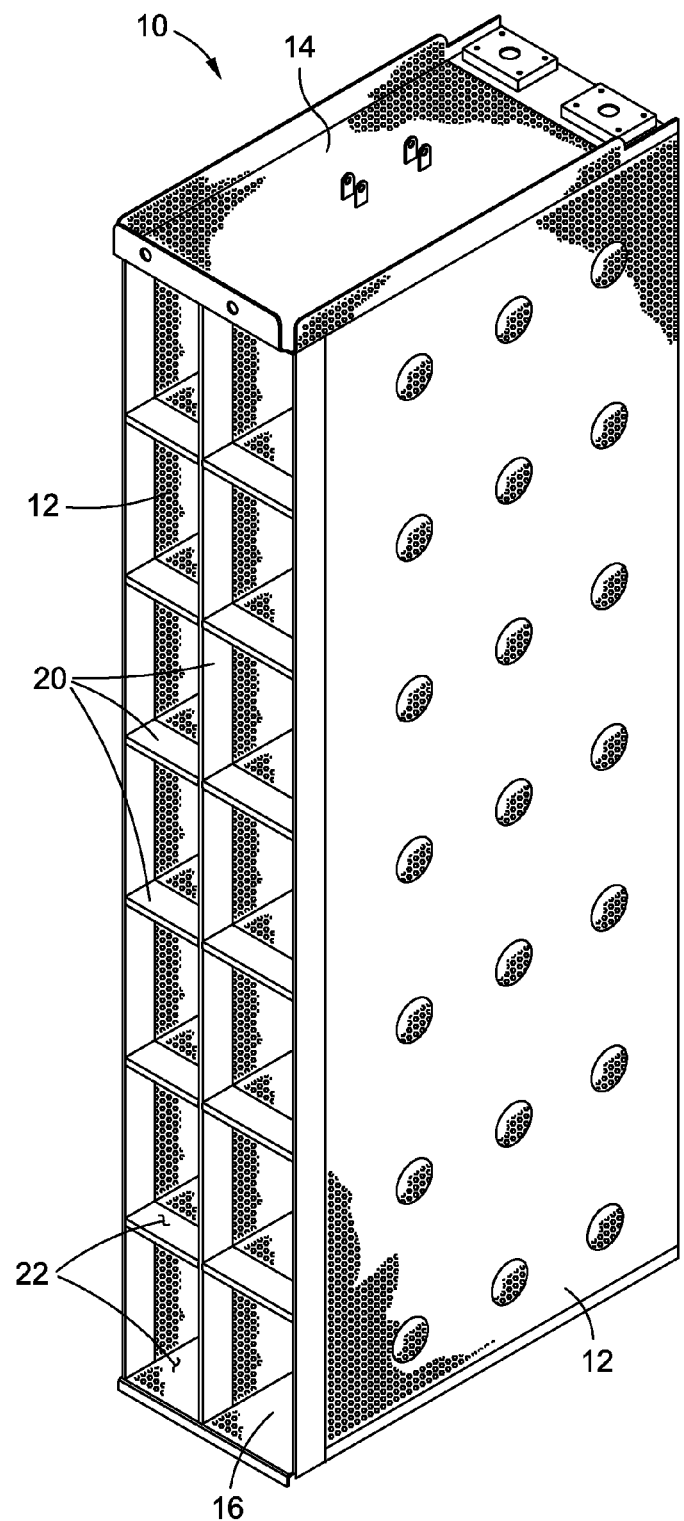
FIG. 1 is a front perspective view of an exemplary strainer cassette or cartridge which may be integrated into the strainer system of the present invention.
Figure 2:
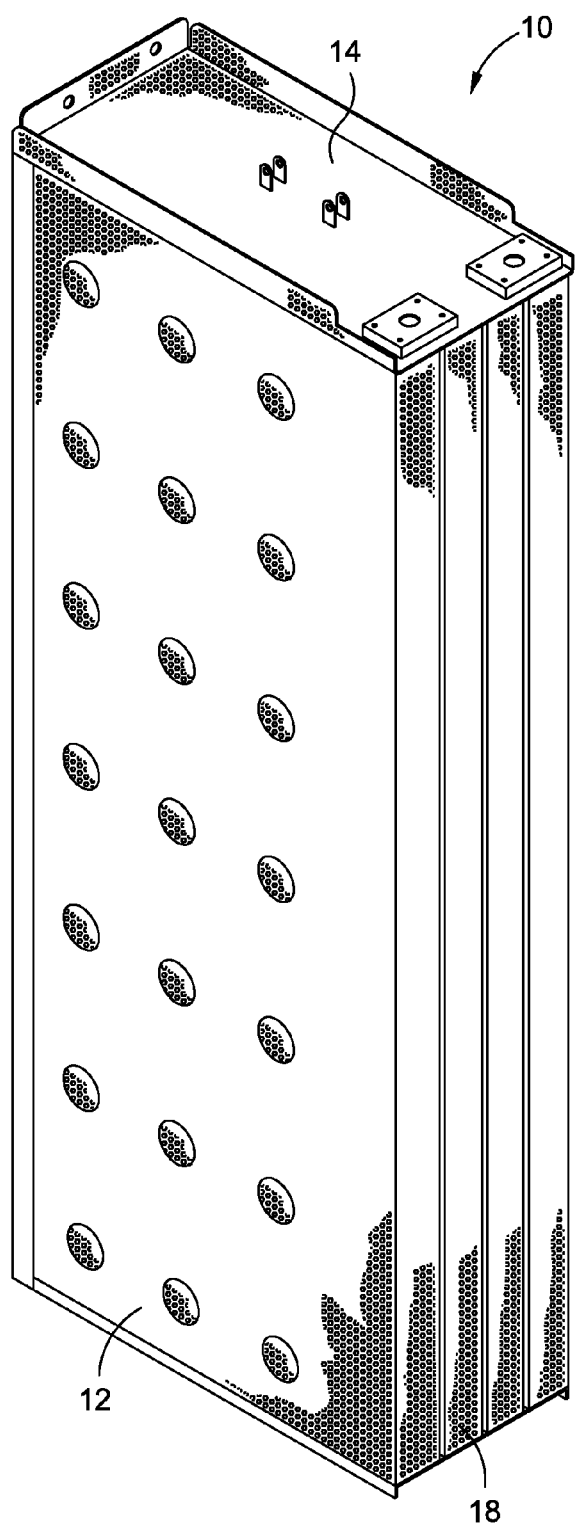
FIG. 2 is a rear perspective view of the strainer cartridge shown in FIG. 1.
Figure 4:
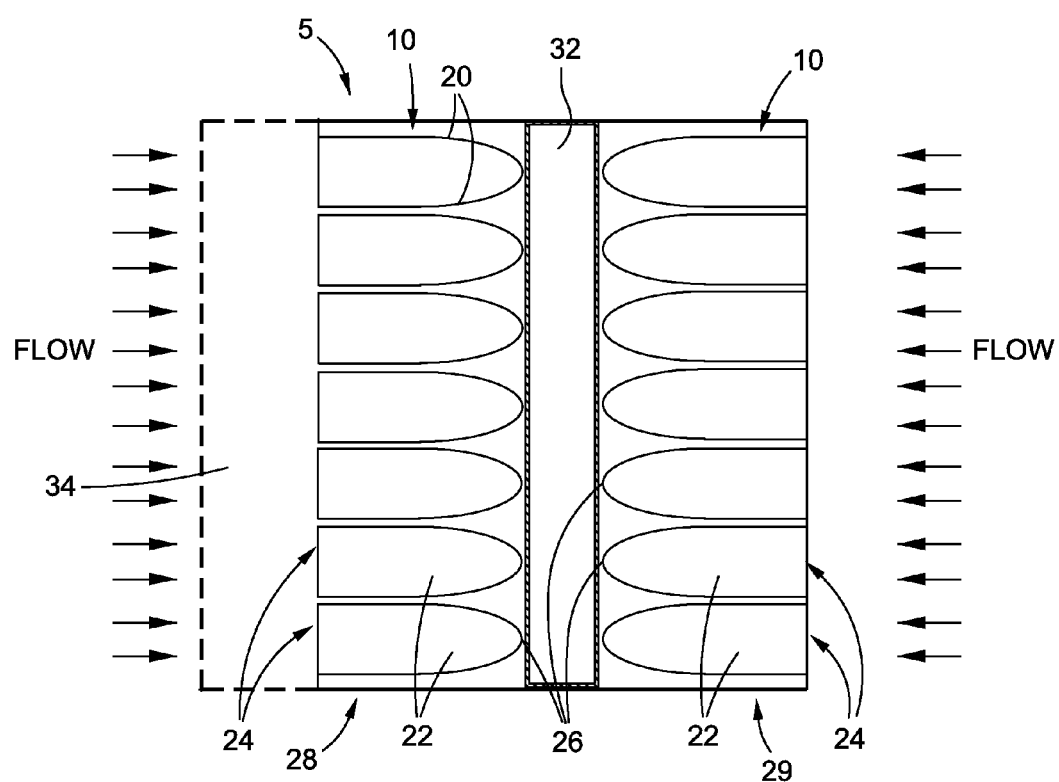
FIG. 4 is a cross-sectional view of one exemplary configuration of the strainer system of the present invention which includes an opposed pair of the strainer modules shown in FIG. 3.

Referring now to the drawings wherein the showings are for purposes of illustrating preferred embodiments of the present invention only, and not for purposes of limiting the same, FIGS. 1 and 2 illustrate an exemplary strainer cassette or cartridge 10 which may be integrated into an exemplary strainer system 5 constructed in accordance with the present invention and shown in FIG. 4. The cartridge 10 has a generally quadrangular configuration. When viewed from the perspective shown in FIGS. 1 and 2, the cartridge 10 includes an opposed pair of side walls 12 extending in spaced, generally parallel relation to each other, a top wall 14 extending between the top edges of the side walls 12, a bottom wall 16 extending in spaced, generally parallel relation to the top wall 14 between the bottom edges of the side walls 12, and a back wall 18 which extends between the back edges of the side walls 12 and between the back edges of the top and bottom walls 14, 16. In the strainer cartridge 10, the side, top, bottom and back walls 12, 14, 16, 18 are each fabricated from a perforated metal material.

The strainer cartridge 10 further comprises a plurality of separator plates 20 which, when viewed from the perspective shown in FIGS. 1 and 2, are horizontally and vertically oriented between the side, top, bottom and back walls 12, 14, 16, 18 in a prescribed arrangement. More particularly, the separator plates 20 are arranged such that they, along with the side, top, bottom and back walls 12, 14, 16, 18, collectively define a plurality of strainer pockets 22 within the strainer cartridge 10. In the exemplary strainer cartridge 10 shown in FIGS. 1 and 2, a total of fourteen (14) strainer pockets 22 are included in the strainer cartridge 10, with the strainer pockets 22 being arranged in two side-by-side vertical columns of seven (7) strainer pockets 22 each. Like the side, top, bottom and back walls 12, 14, 16, 18, each of the separator plates 20 is fabricated from a perforated metal material. Those of ordinary skill in the art will recognize that the strainer cartridge 10 may be fabricated to include greater or fewer than fourteen (14) strainer pockets 22 without departing from the spirit and scope of the present invention.

Figure 3:
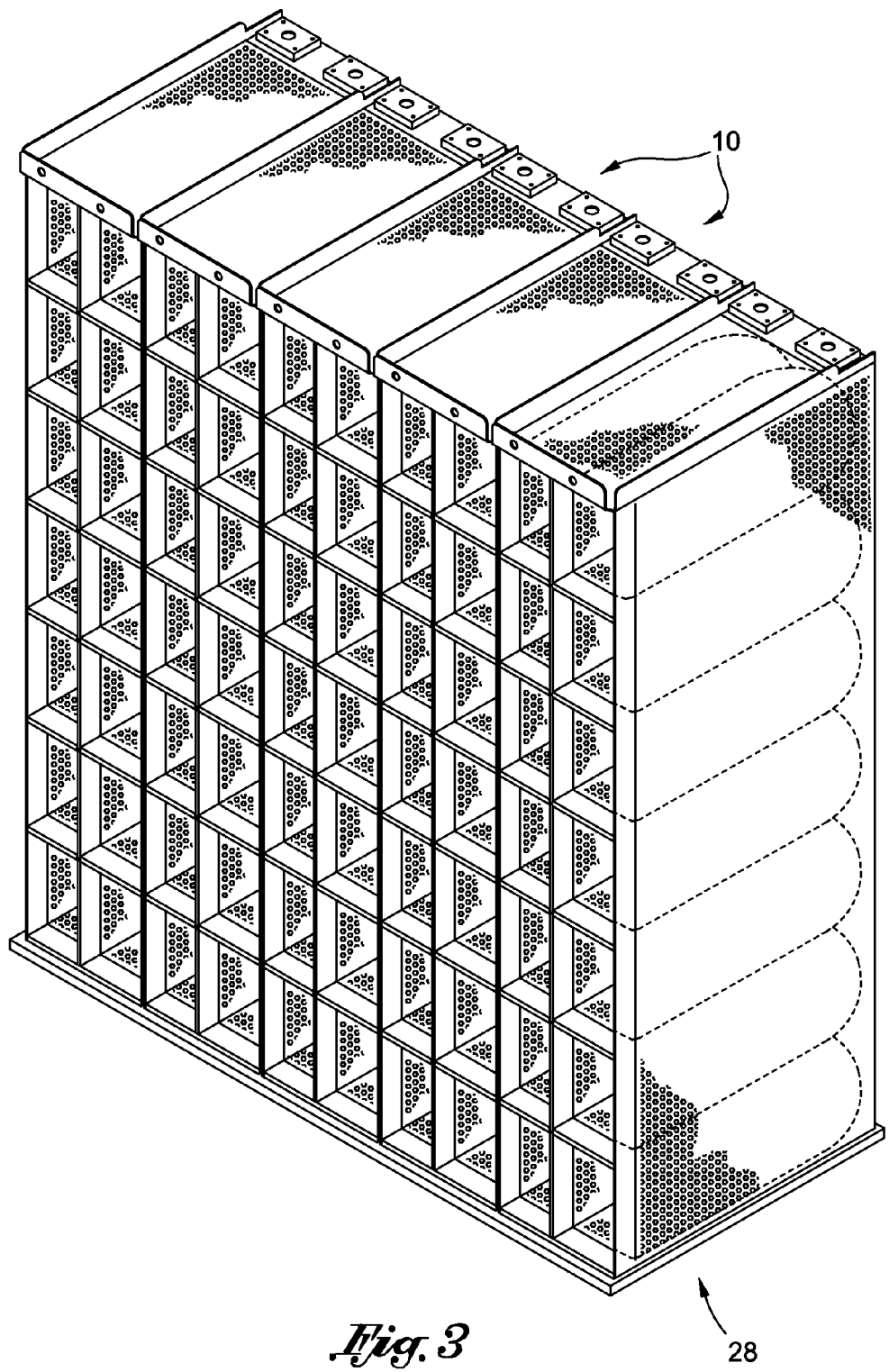
FIG. 3 is a front perspective view of a strainer module which may be integrated into the strainer system of the present invention and comprises multiple strainer cartridges as shown in FIGS. 1 and 2.

FIG. 3 depicts an exemplary strainer module 28 assembled by placing multiple strainer cartridges 10 in side-by-side relation to each other. As is apparent from FIGS. 3 and 4, the horizontally oriented separator plates 20 included in the strainer cartridge 10 are preferably formed in a manner which imparts a generally parabolic configuration to each of the strainer pockets 22. In this regard, each of the strainer pockets 22 includes an open inflow end 24 at the front edges of the side, top, bottom and back walls 12, 14, 16, 18 and the front edges of the separator plates 20. In addition to the inflow end 24, each strainer pocket 22 includes an arcuate, concave back end 26 which is disposed proximate the back wall 18 of the strainer cartridge 10. In the exemplary strainer module 28 shown in FIG. 3, a total of five (5) strainer cartridges 10 are included therein. The strainer cartridges 10 in the strainer module are arranged such that the inflow ends 24 defined by the strainer pockets 22 thereof face in a common direction. The inflow ends 24 of the strainer pockets 22 within the strainer module 28 collectively define a primary strainer surface thereof. Those of ordinary skill in the art will recognize that the strainer module 28 may be assembled to include greater or fewer than five (5) strainer cartridges 10 without departing from the spirit and scope of the present invention.

As indicated above, FIG. 4 depicts the strainer system 5 of the present invention. The strainer system 5 preferably includes the strainer module 28 shown in FIG. 3 as paired with a second strainer module 29. The strainer module 29 is identical to the strainer module 28. In the strainer system 5, the strainer modules 28, 29 are oriented in spaced, back-to-back relation to each other, with a suction plenum 32 being defined between the back walls of the strainer modules 28, 29. As will be recognized, in the strainer system 5, the activation of a pump fluidly coupled to the suction plenum 32 creates a differential pressure condition which effectively draws liquid into the inflow ends 24 of the strainer pockets 22 of the strainer cartridges 10 within each of the opposed strainer modules 28, 29, such liquid ultimately passing through the strainer cartridges 10 as a result of the perforated metal construction thereof, and into the suction plenum 32.

The configuration of the strainer system 5 as shown in FIG. 4 is also intended to be exemplary only, with those of ordinary skill in the art recognizing that such strainer system 5 may be provided with greater or fewer than the two strainer modules 28, 29, in other arrangements other than that shown in FIG. 4, without departing from the spirit and scope of the present invention. In this regard, as will be discussed in more detail below, the present invention is directed in large measure toward the structural features added to one or both strainer modules 28, 29 to facilitate a reduction in the differential pressure experienced across the strainer system 5 in nuclear power plants with medium to high fiber loads after chemical precipitate formation. In accordance with the present invention, this structural feature or enhancement is a debris interceptor 34 which is schematically represented in FIG. 4, and is outfitted onto at least one of the strainer modules 28, 29 included in the strainer system 5 so as to cover at least the primary strainer surface defined thereby. Various embodiments of the debris interceptor 34 will now be described with particular regard to FIGS. 5-8. The debris interceptor 34 may also be characterized as a sacrificial strainer or pre-filter.

Figure 5:
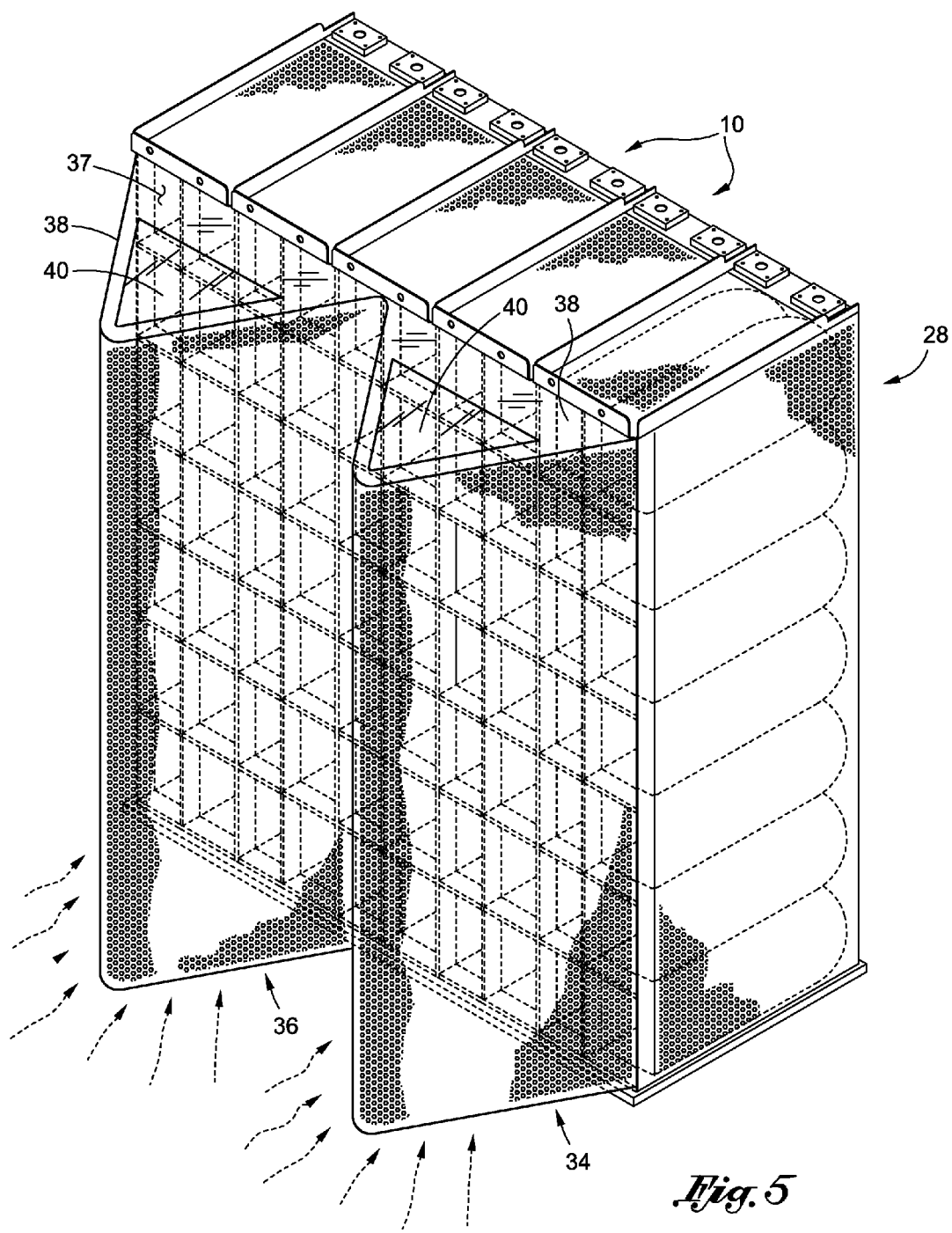
FIG. 5 is a front perspective view of one of the strainer modules integrated into the strainer system shown in FIG. 4 as outfitted with a debris interceptor comprising sacrificial strainer screen in accordance with a first embodiment of the present invention.

Referring now to FIG. 5, the strainer module 28 of the strainer system 5 is shown as being outfitted with a debris interceptor 34 which comprises a sacrificial strainer screen 36 constructed in accordance with a first embodiment of the present invention. The strainer screen 36 is cooperatively engaged to the strainer module 28 so as to protrude from the primary strainer surface defined thereby. As a result, an auxiliary suction plenum 37 is defined between the interior surface of the strainer screen 36 and the primary strainer surface of the strainer module 28.

In the exemplary embodiment shown in FIG. 5, the strainer screen 36 has a generally serpentine configuration. Due to its serpentine configuration, the strainer screen 36, when viewed from the perspective shown in FIG. 5, defines a spaced pair of top panels 38 which each have a generally triangular configuration. As will be recognized, the serpentine configuration of the strainer screen 36 results in the same defining a greater outer surface area in comparison to what would be achieved it such strainer screen 36 was provided with a generally planar configuration. Due to the relative sizes/shapes of the strainer module 28 and corresponding strainer screen 36, two (2) top panels 38 are defined by the strainer screen 36. However, those of ordinary skill in the art will recognize that if, for example, the strainer module 28 were assembled to include more than five strainer cartridges 10, the corresponding size/shape of the strainer screen 36 would typically result in the same defining three or more top panels 38. Conversely, the assembly of the strainer module 28 to include less than five strainer cartridges 10 could result in the strainer screen 36 being of a corresponding size/shape as results in the same defining only a single top panel 38.

The strainer screen 36 is preferably fabricated from a perforated, plate-like metal material as it allows it to provide a filter surface for incoming "dirty" water flow. In this regard, as will be recognized by those of ordinary kill in the art, in the strainer system 5 including the strainer module 28 as outfitted with a strainer screen 36, water must first pass through such strainer screens 36 prior to reaching the primary strainer surfaces defined by the corresponding strainer module 28.

In the strainer screen 36, it is contemplated that one or more of the top panels 38 defined thereby will include a differential pressure activated (e.g., rupturable) or controlled membrane 40 integrated therein. The term "membrane" as used in the present application is intended to encompass any panel, sheet, plate or similar structure which is ruptured or otherwise actuated to an open position when subjected to a prescribed pressure condition. In the exemplary strainer screen 36 shown in FIG. 5, membranes 40 are integrated into respective ones of each of the two top panels 38 defined thereby. However, those of ordinary skill in the art will recognize that the strainer screen 36 may be outfitted with only a single membrane 40 within one of the top panels 38 thereof. Each membrane 40 is uniquely configured to be actuated from a normally closed position to an open position once a pre-defined differential pressure set point is reached as results from the accumulation of debris (mechanical and/or chemical) on the exterior surface of the strainer screen 36. Advantageously, the movement of the membrane(s) 40 to the open position creates an open flow path around the bulk of the accumulated debris and into the auxiliary suction plenum 37, and hence directly to the primary strainer surface of the strainer module 28 underlying the debris laden strainer screen 36. Flow into the auxiliary suction plenum 37 through the openings defined by the ruptured or otherwise opened membrane(s) 40 effectively reduces approach and penetration velocities within the strainer pockets 22 of the strainer module 28, which in turn reduces the likelihood of another dense critical debris layer being formed on the primary strainer surface, and further reducing additional bypass debris. As such, the aforementioned functionality of the strainer screen 36 and membrane (s) 40 included therein allows the primary strainer surface of the strainer module 28 to remain fairly clean until the set point differential pressure is reached across the strainer screen 36. Any remaining debris which arrives at the strainer module 28 later in the accident mitigation will then accumulate on a fairly clean surface, i.e., the primary strainer surface.

As previously explained, depending on the plant specific variables (flow rate, debris types and quantities, components in the containment, buffer, submergence, allowable NPSH, temperature curve, etc), the bulk of the fiber and particulate debris should already be on the strainer screen 36 prior to any pressure controlled membrane(s) 40 thereof being actuated to an open position. At some point hours to days after the initial loss of coolant accident, the temperature in the containment will fall to the point that chemical precipitates will have begun to form and accumulate on exposed surfaces including the fibrous debris, thus helping to prevent additional fibrous debris which would normally release due to erosion from transporting due to a chemical precipitate coating being formed thereon. It will be recognized that the functionality of the strainer module 29 within the strainer system 5, if it is outfitted with its own debris interceptor 34 comprising the strainer screen 36, will mirror the aforementioned description regarding the combination of the strainer module 28 and strainer screen 36.

Figure 6:
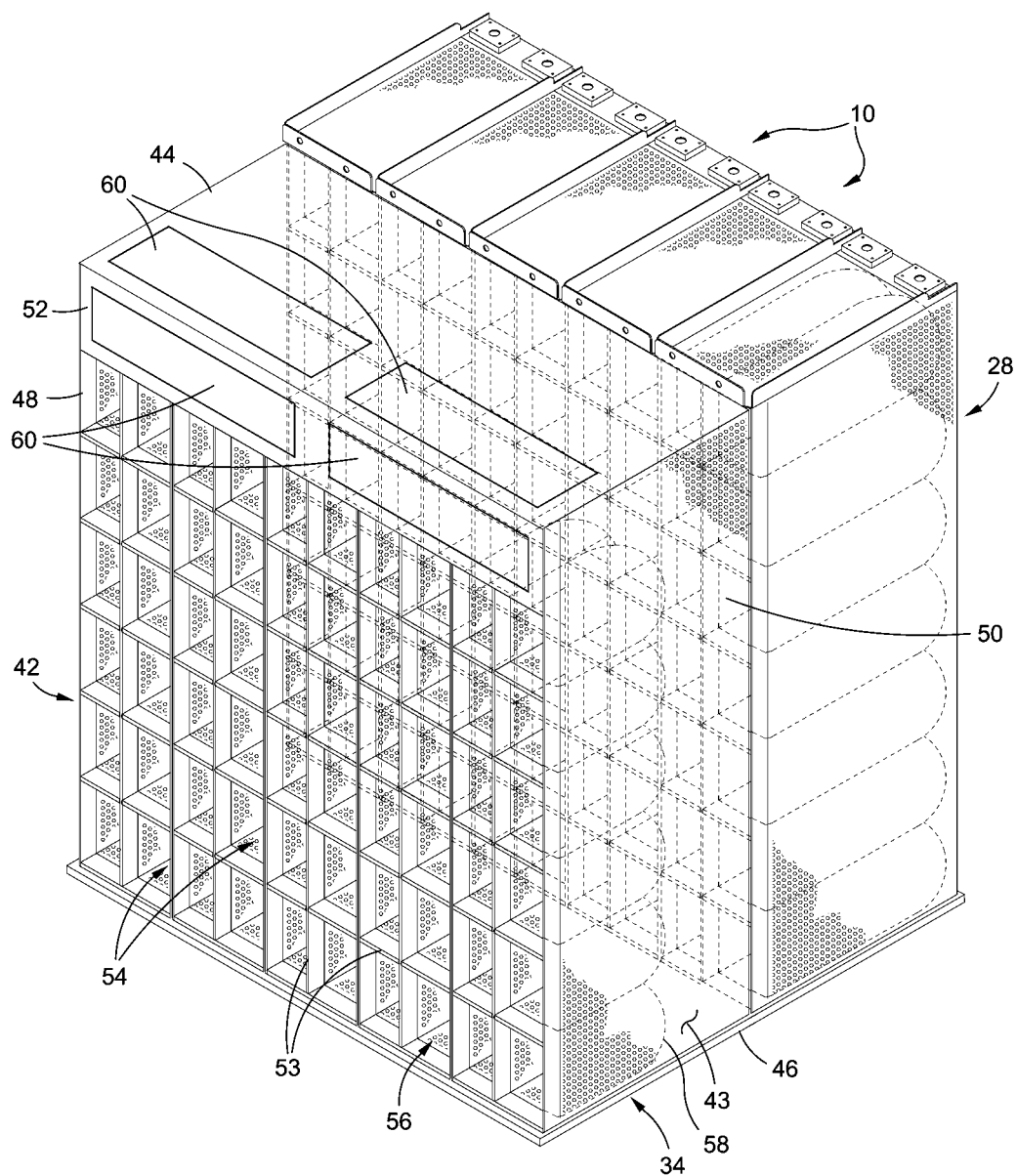
FIG. 6 is a front perspective view of one of the strainer modules integrated into the strainer system shown in FIG. 4 as outfitted with a debris interceptor comprising a sacrificial strainer in accordance with a second embodiment of the present invention.

Referring now to FIG. 6, the strainer module 28 of the strainer system 5 is shown as being outfitted with a debris interceptor 34 which comprises a sacrificial secondary strainer 42 constructed in accordance with a second embodiment of the present invention. The secondary strainer 42 is cooperatively engaged to the strainer module 28 so as to protrude from the primary strainer surface defined thereby. As a result, portions of the secondary strainer 42 and the primary strainer surface of the strainer module 28 collectively define an auxiliary suction plenum 43.

In the exemplary embodiment shown in FIG. 6, the secondary strainer 42 has a configuration which closely mirrors that of the underlying strainer module 28. In this regard, the secondary strainer 42 has a generally quadrangular configuration and is formed from a plurality of generally planar plates which are attached to each other in a prescribed arrangement. More particularly, when viewed from the perspective shown in FIG. 6, the secondary strainer 42 comprises opposed top and bottom plates 44, 46, and opposed left and right side plates 48, 50 which are each fabricated from perforated or non-perforated metal material. The top and bottom plates 44, 46 and left and right side plates 48, 50 collectively define the periphery of the secondary strainer 42. The secondary strainer 42 also includes a forwardly facing front plate 52 which extends along the length of the top plate 44 between the left and right side plates 48, 50, and is also formed from perforated or non-perforated metal material. Further, in the secondary strainer 42, a plurality of separator plates 53 are arranged between the bottom and front plates 46, 52, and between the left and right side plates 48, 50 as facilitates the formation of a multiplicity of strainer pockets 54 of the secondary strainer 42. In the exemplary secondary strainer 42 shown in FIG. 6, a total of sixty (60) strainer pockets 54 are included therein and arranged in side-by-side vertical columns of six (6) strainer pockets 54 each. The separator plates 53 are each preferably fabricated from a perforated metal material. Those of ordinary skill in the art will recognize that the secondary strainer 42 may be fabricated to include greater or fewer than sixty (60) strainer pockets 54 without departing from the spirit and scope of the present invention.

Each of the strainer pockets 54 in the secondary strainer 42 preferably has a generally quadrangular configuration. As is apparent from FIG. 6, the horizontally oriented separator plates 53 included in the secondary strainer 42 are preferably formed in a manner which imparts a generally parabolic configuration to each of the strainer pockets 54. As such, each of the strainer pockets 22 includes an open inflow end 56 at the front edges of the separator plates 53 and an opposed back end 58 which has a generally arcuate, concave configuration. As is further seen in FIG. 6, the inflow ends 56 of the strainer pockets 54 and the front plate 52 face in a common direction. The aforementioned description of the configuration of each of the strainer pockets 54 is exemplary only, with those of ordinary skill in the art recognizing that such configurations may be varied depending on bypass and/or other performance requirements specific to the installation site for the strainer system 5.

In the secondary strainer 42, it is contemplated that the top and/or front plates 44, 52 will include one or more differential pressure activated (e.g., rupturable) membranes 60 integrated therein. In the exemplary secondary strainer 42 shown in FIG. 6, a pair of generally rectangular membranes 60 are integrated into the front plate 52 in side-by-side relation to each other, with another pair of generally rectangular membranes 60 being integrated into the top plate 44 in side-by-side relation to each other, thus facilitating the inclusion of a total of four (4) membranes 60 in the secondary strainer 42. However, those of ordinary skill in the art will recognize that the secondary strainer 42 may be outfitted with greater or fewer than four (4) membranes 60, and that the membrane(s) 60 may be integrated into the top and/or front plates 44, 52 in any number or arrangement.

The functionality of the membranes 60 is substantially similar to the membranes 40 described above in relation to the strainer screen 36. In this regard, each membrane 60 is uniquely configured to be actuated from a normally closed position to an open position once a pre-defined differential pressure set point is reached as results from the accumulation of debris upon the secondary strainer 42, including the interiors of the strainer pockets 54 thereof. The movement of the membrane(s) 60 to the open position creates an open flow path around the bulk of the debris which accumulates on the secondary strainer 42 and into the auxiliary suction plenum 43 which is defined between the arcuate back ends 58 of the strainer pockets 54 and the primary strainer surface of the strainer module 28. As such, the movement of the membrane(s) 60 to the open position facilitates flow directly to the primary strainer surface of the strainer module 28 underlying the debris laden secondary strainer 42. Such flow into the auxiliary suction plenum 43 provides the same advantages described above in relation to the strainer module 28/strainer screen 36 combination shown in FIG. 5.

It is contemplated that the size, number and location of any membranes 60 included in the secondary strainer 42 will be based, in large measure, on the water depth of the containment in which the strainer system 5 including the secondary strainer(s) 42 is installed. In this regard, the integration of one or more membrane(s) 60 into the top plate 44 would typically be useful in an installation where the water level is sufficiently deep to avoid vortexing. Along these lines, if any membrane 60 integrated into the top plate 44 were to be opened or activated and the water level in the containment becomes too low, there is the potential for vortexing to occur which could lead to the highly undesirable occurrence of air being ingested into the strainer module 28. If the installation site variables lend themselves to this potential scenario, it is contemplated that one or more membranes 60 will be integrated only into the front plate 52 or side plate 50. However, even if one or more membranes 60 are integrated into the top plate 44 and a low water level condition arises, other methods may be employed to facilitate the prevention of vortexing, including the potential inclusion of an additional plate adjacent the top plate 44 to create a more tortuous path for air.

It is further contemplated that within the strainer system 5 including the secondary strainer(s) 42, one or more connecting ducts can be used to facilitate the fluid communication between the auxiliary suction plenum(s) 43 and the primary suction plenum 32, such connecting duct(s) running underneath the strainer module 28 alone or in combination with the strainer module 29. It will also be recognized that the functionality of the strainer module 29 within the strainer system 5, if it is outfitted with its own debris interceptor 34 comprising the secondary strainer 42, will mirror the aforementioned description regarding the combination of the strainer module 28 and secondary strainer 42.

Referring now to FIG. 7, the strainer module 28 of the strainer system 5 is shown as being outfitted with a debris interceptor 34 which comprises a sacrificial mesh layer 62 constructed in accordance with a third embodiment of the present invention. The mesh layer 62 is cooperatively engaged to the strainer module 28 so as to cover and protrude from the primary strainer surface defined thereby.

In the exemplary embodiment shown in FIG. 7, the mesh layer 62 is of a prescribed thickness, and is preferably fabricated from a layered stainless steel mesh such as Tissmetal® Type 450-16. The mesh layer 62 may be positioned over a perforated stainless steel plate which is sized and configured to cover the entirety of the primary strainer surface of the strainer module 28. The mesh layer 62 may alternatively comprise a stainless steel mesh screen with <0.5 mm openings. As indicated above, the length and width dimensions of the mesh layer 62 are such that the entirety of the primary strainer surface of the strainer module 28, and thus then inflow ends 24 of each of the strainer pockets 22 defined thereby, are covered by the mesh layer 62 alone or in combination with the aforementioned, underlying perforated plate. However, as is further seen in FIG. 7, it is contemplated that the interior surfaces of one or more of the strainer pockets 22 within the strainer module 28 may be fully or partially lined with a relatively thin layer of the same material used to form the mesh layer 62.

As previously explained, the application of the mesh layer 62 to the primary strainer surface of the strainer module 28 facilitates the creation of a lower density debris bed in a loss of coolant accident. This lower density debris bed in certain debris loads can result in a lower final differential across the strainer system 5 including the mesh layer 62. In this regard, the lower density debris bed allows the arriving particulate or chemical precipitate to penetrate the debris bed in greater depth than a higher density debris bed. This increased bed penetration helps prevent the debris from forming a critical debris layer on the outermost surface of the debris bed, the mesh layer 62 inducing such lower density debris bed. In this regard, as also previously explained, the incoming debris collects along the mesh surfaces of the mesh layer 62 as it travels toward the primary strainer surface of the strainer module 28. Because the fibrous debris tends to agglomerate with other fibrous debris, the volume based strainer created by the mesh layer 62 in combination with the strainer module 28 is operative to prevent a dense, uniform bed from forming on the strainer system 5 including the mesh layer 62, with the induced debris bed configuration further reducing head loss and debris bypass across such strainer system 5. It will be recognized by those of ordinary skill in the art that the functionality of the strainer module 29 within the strainer system 5, if outfitted with its own debris interceptor 34 comprising the mesh layer 62, will mirror the aforementioned description regarding the combination of the strainer module 28 and mesh layer 62.

Referring now to FIG. 8, the strainer module 28 of the strainer system 5 is shown as being outfitted with a debris interceptor 34 which comprises a multiplicity of mesh cubes 64 which are maintained in cooperative engagement to the strainer module 28 such that the primary strainer surface thereof is covered by such mesh cubes 64. In the strainer system 5 including them mesh cubes 64, it is contemplated that such mesh cubes 64 will be accommodated within a perforated housing structure 65 which may be attached to the strainer module 28, and is sized and configured to effectively maintain the mesh cubes 64 in an orientation relative to the strainer module 28 such that the primary strainer surface is covered or shielded in its entirety by the mesh cubes 64.

It is contemplated that the mesh cubes 64 will be hollow, and may be fabricated in one of a plurality of different sizes and/or mesh densities, with the particular size and/or mesh density being application specific. It is also contemplated that the mesh cubes 64 may be provided in varying sizes and mesh densities, and arranged relative to the primary strainer surface of the strainer module 28 such that the mesh cubes 64 are of progressively smaller sizes and finer mesh densities (i.e., a gradient) as they approach the primary strainer surface. Along these lines, as further shown in FIG. 8, it is contemplated that one or more of the strainer pockets 22 of the strainer module 28 may be fully or partially filled with mesh cubes 64, which will normally be of an even smaller size and mesh density than those arranged within the housing structure 65 adjacent the inflow ends 24 of the strainer pockets 22. Moreover, it is further contemplated that the mesh cubes 64 of any size or mesh density may be formed to include one or two open sides.

As indicated above, in the strainer system 5 including the mesh cubes 64, smaller mesh cubes 64 fabricated from finer mesh may be employed as the flow approaches the primary strainer surface of the strainer module 28. The mesh cubes 64 essentially serve two purposes. First, they are able to induce a low density debris bed similar to that described above in relation to the mesh layer 62. Secondly, if the debris bed layer becomes dense enough to cause debris bed compression, the random orientation of the mesh cubes 64 can help open less dense flow paths to the primary strainer surface of the strainer module 28, thus preventing a uniform critical debris layer from forming thereon. As indicated above, as an added benefit, if a substantially dense debris bed were to form across the mesh cubes 64, they are designed to flex and deform to induce a rupture in any uniform, dense debris layer which may form. It will be recognized by those of ordinary skill in the art that the functionality of the strainer module 29 within the strainer system 5, if outfitted with its own debris interceptor 34 comprising the mesh cubes 64, will mirror the aforementioned description regarding the combination of the strainer module 28 and mesh cubes 64.

Figure 9:
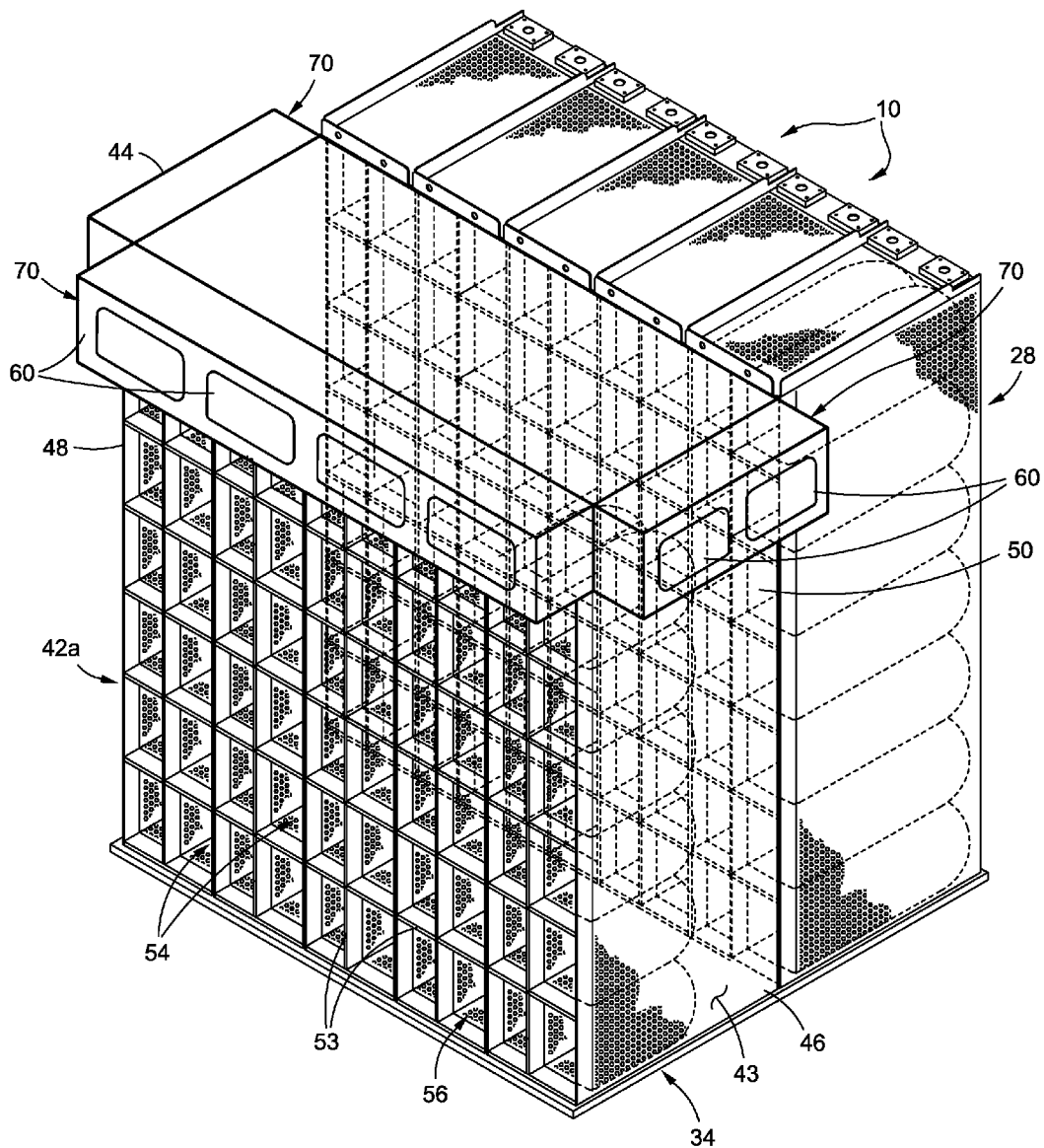
FIG. 9 is a front perspective view of one potential variant of the strainer module shown in FIG. 6.

Referring now to FIG. 9, there is shown the strainer module 28 of the strainer system 5 as outfitted with a pre-filter 34 which comprises a sacrificial secondary strainer 42a. The secondary strainer 42a shown in FIG. 9 is a variant of the secondary strainer 42 shown in FIG. 6, with the secondary strainers 42a, 42 sharing various structural features. In this regard, only the distinctions between the secondary strainers 42a, 42 will be discussed with particularity below.

In the secondary strainer 42 described above, the membranes 60 are included in the forwardly facing front plate 52, and within the top plate 44. However, in the secondary strainer 42a, no membranes 60 are included within the top plate 44 thereof. Further, in the secondary strainer 42a, the front plate 52 is eliminated in favor of a box-like front plenum 70 which extends forwardly from the front edge of the top plate 44, and thus extends generally perpendicularly relative to the front edges of the separator plates 53 which define the strainer pockets 54 of the secondary strainer 42a. The front plenum 70 protruding perpendicularly relative to the front edges of the separator plates 53 defines a generally top surface which extends in generally co-planar relation to the top plate 44, an opposed, generally planar bottom surface which extends in spaced, generally parallel relation to the top surface, and a generally planar, forwardly facing front surface which extends generally perpendicularly between the top and bottom surfaces. As seen in FIG. 9, four (4) membranes 60 are disposed within the forwardly facing front surface of the front plenum 70 in side-by-side relation to each other. Thus, when viewed from the perspective shown in FIG. 9, the membranes 60 of the front plenum 70 are disposed forwardly relative to the inflow ends 56 defined by the strainer pockets 54. Those of ordinary skill in the art will recognize that greater or fewer than four (4) membranes 60 may be included in the front surface of the front plenum 70 without departing from the spirit and scope of the present invention.

As is also seen in FIG. 9, in addition to the forwardly directed front plenum 70, the secondary strainer 42a is outfitted with an opposed, identically configured pair of box-like side plenums 70 having structural attributes which are substantially analogous to those of the front plenum 70. More particularly, when viewed from the perspective shown in FIG. 9, the secondary strainer 42a includes a left side plenum 70 which protrudes generally perpendicularly relative to the left side plate 48, and a right side plenum 70 which protrudes generally perpendicularly relative to the right side plate 50. Like the front plenum 70, the side plenums 70 each define a generally planar top surface which extends in generally co-planar relation to the top plate 44, an opposed, generally planar bottom surface which extends in spaced, generally parallel relation to the top surface, and a generally planar distal surface which extends generally perpendicularly between the top and bottom surfaces. The distal surface of each of the side plenums 70 includes at least one, and preferably a pair of membranes 60 disposed therein in side-by-side relation to each other. Those of ordinary skill in the art will recognize that greater or fewer than two (2) membranes 60 may be included in the distal surface of each side plenum 70 without departing from the spirit and scope of the present invention.

In the secondary strainer 42a, the functionality of the membranes 60 within the front and side plenums 70 essentially mirrors that of the membranes 60 included in the secondary strainer 42. However, in the secondary strainer 42, the flush installation of the membranes 60 within the top and front plates 44, 52 may result in such membranes 60 becoming submerged under a sufficiently thick debris bed. In this instance, even after any one of the membranes 60 of the secondary strainer 42 is activated or actuated from the closed to an open configuration, the thick debris bed formed thereon could potentially remain intact as a result of the absence of any bed ruptures or failures, and inhibit a clear flow path into the auxiliary suction plenum 43 and hence to the primary strainer surface of the strainer module 28. To prevent this scenario, in the secondary strainer 42a, the membranes 60 are extended from the plane of the inflow ends 56 of the strainer pockets 54, and from the left and right side plates 48, 50. In this regard, the lengths, positions and specific geometries of each of the front and side plenums 70 is designed based on plant specific variables, and is chosen to ensure that such plenums 70 act as "snorkels" by ensuring that the membranes 60, and ultimately the openings defined thereby, are adequately extended beyond any debris bed which may form on the secondary strainer 42a in a post-design basis accident environment.

Those of ordinary skill in the art recognize that the size and shape of each of the plenums 70 shown in FIG. 9 is exemplary only, and may be varied without departing from the spirit and scope of the present invention, the ultimate configuration being based on plant specific variables as indicated above. Further, though not shown, it is contemplated that the strainer screen 36 may be alternatively configured such that the membranes 40 thereof are integrated into plenums which are similar to the plenums 70 and project above one or both of the top panels 38.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A strainer system for use in a nuclear reactor containment sump to trap debris present in a post loss of coolant accident, the strainer system comprising:
   at least one strainer module including a plurality of strainer pockets which each define an open inflow end, the inflow ends of the strainer pockets collectively defining a primary strainer surface of the strainer module; and
   a debris interceptor positioned upstream relative to the strainer module in a manner wherein the debris interceptor effectively covers at least a portion of the primary strainer surface and defines an auxiliary suction plenum between the debris interceptor and the strainer module, the auxiliary suction plenum having an open inlet portion and a pressure activated inlet portion, the debris interceptor being sized and configured to effectively trap and thus prevent at least a portion of the debris present in a post loss of coolant accident from reaching the primary strainer surface of the strainer module, the debris interceptor comprising at least one membrane being transitionable from a closed position wherein the pressure activated inlet portion is substantially covered to prevent fluid flow through the pressure activated inlet portion, to an open position wherein the pressure activated inlet portion is at least partially unobstructed to allow for the flow of fluid through the pressure activated inlet portion.

2. The strainer system of claim 1 wherein the debris interceptor comprises a perforated strainer screen which is cooperatively engaged to the strainer module such that the auxiliary suction plenum is defined between the strainer screen and the primary strainer surface.

3. The strainer system of claim 2 wherein the strainer screen includes the at least one membrane which is integrated therein and selectively transitionable from the closed position to the open position allowing for the flow of a fluid directly into the auxiliary suction plenum.

4. The strainer system of claim 3 wherein the strainer screen has a generally serpentine configuration.

5. The strainer system of claim 4 wherein the strainer screen defines at least one top panel which has a generally triangular configuration and includes the at least one membrane integrated therein.

6. The strainer system of claim 3 wherein the membrane is sized and configured to be rupturable upon the application of pressure thereto at a prescribed level.

7. The strainer system of claim 1 wherein the debris interceptor comprises a secondary strainer which is positioned upstream relative to the strainer module such that the auxiliary suction plenum is defined between the secondary strainer and the primary strainer surface.

8. The strainer system of claim 7 wherein the secondary strainer comprises a plurality of strainer pockets which each define an open inflow end, the inflow ends of the strainer pockets facing in a common direction.

9. The strainer system of claim 8 wherein the secondary strainer includes the at least one membrane which is integrated therein and selectively transitionable from the closed position to the open position allowing for the flow of a fluid directly into the auxiliary suction plenum.

10. The strainer system of claim 9 wherein the membrane is sized and configured to be rupturable upon the application of pressure thereto at a prescribed level.

11. The strainer system of claim 9 wherein the secondary strainer includes a plurality of membranes which are integrated therein, and at least one of the membranes is positioned forwardly relative to the inflow ends of the strainer pockets.

12. The strainer system of claim 1 wherein the debris interceptor comprises a mesh layer which is cooperatively engaged to the strainer module such that the primary strainer surface is covered thereby.

13. The strainer system of claim 12 wherein the mesh layer is fabricated from at least one of a layered stainless steel mesh and a single mesh screen.

14. The strainer system of claim 12 wherein at least some of the strainer pockets of the strainer module are at least partially lined with the mesh layer.

15. The strainer system of claim 1 wherein the debris interceptor comprises a multiplicity of mesh cubes which are maintained in cooperative engagement to the strainer module such that the primary strainer surface is at least partially covered thereby.

16. The strainer system of claim 15 wherein the mesh cubes which are distributed in random orientations and maintained within a perforated housing cooperatively engaged to the strainer module.

17. The strainer system of claim 15 wherein the mesh cubes are provided in varying sizes and mesh densities, and arranged relative to the primary strainer surface such that the mesh cubes are of progressively smaller sizes and finer mesh densities as they approach the primary strainer surface.

18. The strainer system of claim 15 wherein at least some of the strainer pockets of the strainer module are at least partially filled with the mesh cubes.

19. A strainer system for use in a nuclear reactor containment sump to trap debris present in a post loss of coolant accident, the strainer system comprising:
 at least one strainer module defining a primary strainer surface; and
 a debris interceptor positioned upstream relative to the strainer module in a manner wherein the debris interceptor effectively covers at least a portion of the primary strainer surface and defines an auxiliary suction plenum between the debris interceptor and the strainer module, the auxiliary suction plenum having an open inlet portion and a pressure activated inlet portion, the debris interceptor being sized and configured to effectively trap and thus prevent at least a portion of the debris present in a post loss of coolant accident from reaching the primary strainer surface of the strainer module, the debris interceptor comprising at least one membrane being transitionable from a closed position wherein the pressure activated inlet portion is substantially covered to prevent fluid flow through the pressure activated inlet portion, to an open position wherein the pressure activated inlet portion is at least partially unobstructed to allow for the flow of fluid through the pressure activated inlet portion.

20. In a strainer system for use in a nuclear reactor containment sump to trap debris present in a post loss of coolant accident and including at least one strainer module defining a primary strainer surface, the improvement comprising:
 a debris interceptor positioned upstream relative to the strainer module in a manner wherein the debris interceptor effectively covers at least a portion of the primary strainer surface and defines an auxiliary suction plenum between the debris interceptor and the strainer module, the auxiliary suction plenum having an open inlet portion and a pressure activated inlet portion, the debris interceptor being sized and configured to effectively trap and thus prevent at least a portion of the debris present in a post loss of coolant accident from reaching the primary strainer surface of the strainer module, the debris interceptor comprising at least one membrane being transitionable from a closed position wherein the pressure activated inlet portion is substantially covered to prevent fluid flow through the pressure activated inlet portion, to an open position wherein the pressure activated inlet portion is at least partially unobstructed to allow for the flow of fluid through the pressure activated inlet portion.

\* \* \* \* \*